United States Patent
Salkintzis

(10) Patent No.: US 12,028,342 B2
(45) Date of Patent: *Jul. 2, 2024

(54) USER AUTHENTICATION USING CONNECTION INFORMATION PROVIDED BY A BLOCKCHAIN NETWORK

(71) Applicant: Lenovo (Singapore) Pte. Ltd., New Tech Park (SG)

(72) Inventor: Apostolis Salkintzis, Athens (GR)

(73) Assignee: Lenovo (Singapore) Pte. Ltd., New Tech Park (SG)

(*) Notice: Subject to any disclaimer, the term of this patent is extended or adjusted under 35 U.S.C. 154(b) by 0 days.

This patent is subject to a terminal disclaimer.

(21) Appl. No.: 18/119,656

(22) Filed: Mar. 9, 2023

(65) Prior Publication Data

US 2023/0216852 A1      Jul. 6, 2023

Related U.S. Application Data

(63) Continuation of application No. 16/645,324, filed as application No. PCT/EP2017/078247 on Nov. 3, 2017, now Pat. No. 11,621,959.

(51) Int. Cl.
*H04L 9/40* (2022.01)
*G06Q 20/38* (2012.01)
*H04L 65/1069* (2022.01)

(52) U.S. Cl.
CPC ... *H04L 63/0892* (2013.01); *G06Q 20/38215* (2013.01); *H04L 65/1069* (2013.01)

(58) Field of Classification Search
None
See application file for complete search history.

(56) References Cited

U.S. PATENT DOCUMENTS

| | | |
|---|---|---|
| 10,299,128 B1 | 5/2019 | Suthar et al. |
| 10,805,085 B1 | 10/2020 | Liang |
| 2004/0153555 A1 | 8/2004 | Haverinen et al. |
| 2009/0064281 A1 | 3/2009 | Esaka et al. |
| 2009/0328167 A1 | 12/2009 | O'Mahony |

(Continued)

FOREIGN PATENT DOCUMENTS

WO        00/29904 A1    5/2000

OTHER PUBLICATIONS

S. Raju et al., "Identity Management Using Blockchain for Cognitive Cellular Networks", IEEE International Conference on Communications, Jul. 31, 2017, pp. 1-2.

(Continued)

*Primary Examiner* — Scott B Christensen
(74) *Attorney, Agent, or Firm* — Kunzler Bean & Adamson

(57) ABSTRACT

Apparatuses, methods, and systems are disclosed for user authentication using a connection information package provided by a blockchain network. One apparatus includes a processor and a memory coupled to the processor, the memory comprising instructions executable by the processor to cause the apparatus to receive, from a smart contract, a set of connection information packages and to receive, from a first function, a request to authenticate a roaming user. The instructions are further executable by the processor to cause the apparatus to determine whether the first function is associated with a valid connection information package and to accept the request to authenticate the roaming user in response to the first function being associated with the valid connection information package.

20 Claims, 8 Drawing Sheets

(56) References Cited

U.S. PATENT DOCUMENTS

| | | |
|---|---|---|
| 2017/0156105 A1 | 6/2017 | Mustajarvi et al. |
| 2017/0244721 A1 | 8/2017 | Kurian et al. |
| 2017/0244757 A1 | 8/2017 | Castinado et al. |
| 2017/0257895 A1 | 9/2017 | Kawakami et al. |
| 2017/0295475 A1 | 10/2017 | Patel et al. |
| 2017/0331887 A1 | 11/2017 | Fishler et al. |
| 2018/0276674 A1 | 9/2018 | Ramatchandirane et al. |
| 2018/0332457 A1 | 11/2018 | Thiebaut et al. |

OTHER PUBLICATIONS

Winter et al., "Dynamic Peer Discovery for Radius/TLS and Radius/DTLS Based on the Network Access Identifier (NAI)", IETF, RFC 7585, Oct. 2015, pp. 1-32.

USER AUTHENTICATION USING CONNECTION INFORMATION PROVIDED BY A BLOCKCHAIN NETWORK

CROSS-REFERENCE TO RELATED APPLICATIONS

This is a continuation application of and claims priority to U.S. patent application Ser. No. 16/645,324 entitled "USER AUTHENTICATION USING CONNECTION INFORMATION PROVIDED BY A BLOCKCHAIN NETWORK" and filed on Mar. 6, 2020 for Apostolis Salkintzis, which is incorporated herein by reference. U.S. application Ser. No. 16/645,324 claims priority to International Patent Application No. PCT/EP2017/078247 filed on Nov. 3, 2017 for Apostolis Salkintzis, the entire contents of which are incorporated herein by reference for all purposes. See MPEP § 213.

FIELD

The subject matter disclosed herein relates generally to wireless communications and more particularly relates to using a connection information package from a blockchain network to authenticate a user in a visited network via an authentication server in the home network.

BACKGROUND

When a user is roaming outside the coverage area of its home network, the user may select to access a visited mobile network for obtaining access to mobile services. In order to access the visited mobile network a so-called roaming agreement must exist between the visited mobile network and the home mobile network. This roaming agreement may be direct between the two networks or may be indirect via a roaming hub. The roaming agreement enables secure connections to be established between the two networks in order to authenticate roaming users, transfer charging records, etc. As an example, the roaming agreement enables an Authentication, Authorization & Accounting ("AAA") function in the visited network to establish a connection to an AAA function in the home network and to have the mobile user authenticated by the home mobile network. Thus, without a roaming agreement between the visited and the home mobile networks a roaming user cannot be authenticated by the home network and be authorized to access the visited network.

BRIEF SUMMARY

Methods for using a connection information package from a blockchain network to authenticate a user in a visited network via an authentication server in the home network are disclosed. Apparatuses and systems also perform the functions of the methods. In some embodiments, a method of a network function for user authentication using a connection information package provided by a blockchain network includes receiving a request to authenticate a user, the request containing a username and a realm, and identifying a first address on a blockchain network corresponding to the realm. The method includes sending a message to the first address on the blockchain network, the message containing a payment, and receiving a connection information package from the first address on the blockchain network after the payment is confirmed. The method also includes establishing a connection with an authentication server in the realm using the connection information package and authenticating the user via the authentication server in the realm.

Another method of a network apparatus for user authentication using a connection information package provided by a blockchain network includes a home AAA function receiving, from a first address on a blockchain network, a plurality of connection information packages. Here, each connection information package is created in response to a message sent to the first address in the blockchain network. Said method also includes receiving, from a first function, a request to authenticate a user and determining whether the first function is associated with a valid one of the plurality of connection information packages. In response to the first function being associated with one of the plurality of connection information package, the method includes accepting, at the home AAA function, the request to authenticate a user.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
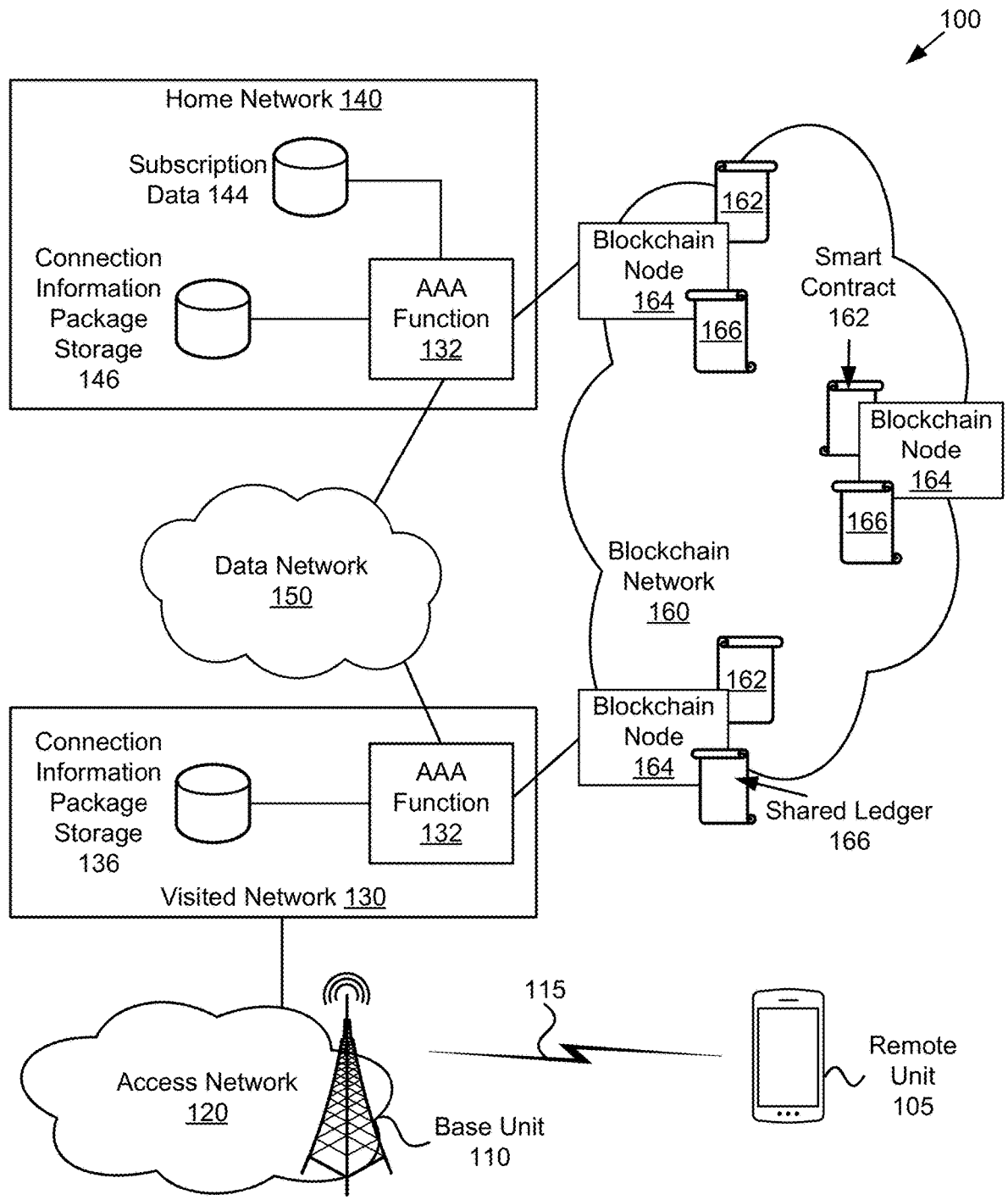
FIG. 1 is a schematic block diagram illustrating one embodiment of a wireless communication system for using a connection information package from a blockchain network to authenticate a user in a visited network via an authentication server in the home network.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM") (also referred to as "Flash memory"), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C. As used herein, "a member selected from the group consisting of A, B, and C and combinations thereof" includes only A, only B, only C, a combination of A and B, a combination of B and C, a combination of A and C or a combination of A, B and C.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams.

The code may also be loaded onto a computer, other programmable data processing apparatus, or other devices to cause a series of operational steps to be performed on the computer, other programmable apparatus, or other devices to produce a computer implemented process such that the code which execute on the computer or other programmable apparatus provide processes for implementing the functions/acts specified in the schematic flowchart diagrams and/or schematic block diagram.

The schematic flowchart diagrams and/or schematic block diagrams in the Figures illustrate the architecture, functionality, and operation of possible implementations of apparatuses, systems, methods, and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

The description of elements in each figure may refer to elements of proceeding figures. Like numbers refer to like elements in all figures, including alternate embodiments of like elements.

The disclosed embodiments consider online payments made via a blockchain network. Such payments can be nearly real-time (fast) and can trigger a sequence of other events, such as the creation and the assignment of connection information packages. Advantageously, this makes it possible for a mobile user to access a visited network (e.g., a mobile network or a wireless local area network ("WLAN")) even when the visited network does not have a roaming agreement with the user's home network.

FIG. 1 depicts a wireless communication system 100 for using a connection information package from a blockchain network to authenticate a user in a visited network via an authentication server in the home network, according to embodiments of the disclosure. In one embodiment, the wireless communication system 100 includes at least one remote unit 105, an access network 120 containing at least one base unit 110, wireless communication links 115, a visited network 130, a home network 140 of a remote unit 105, and a blockchain network 160. Even though a specific number of remote units 105, access networks 120, base units 110, wireless communication links 115, visited networks 130, home networks 140, and blockchain networks 160 are depicted in FIG. 1, one of skill in the art will recognize that any number of remote units 105, access networks 120, base units 110, wireless communication links 115, visited networks 130, home networks 140, and blockchain networks 160 may be included in the wireless communication system 100. In another embodiment, the access network 120 contains one or more WLAN (e.g., Wi-Fi™) access points.

In one implementation, the wireless communication system 100 is compliant with the Fifth Generation ("5G") system specified in the Third Generation Partnership Project ("3GPP") specifications. More generally, however, the wireless communication system 100 may implement some other open or proprietary communication network, for example, Long-Term Evolution ("LTE") or Worldwide Interoperability for Microwave Access ("WiMAX"), among other networks. The present disclosure is not intended to be limited to the implementation of any particular wireless communication system architecture or protocol.

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like.

Moreover, the remote units 105 may be referred to as subscriber units, mobiles, mobile stations, users, terminals, mobile terminals, fixed terminals, subscriber stations, User Equipment ("UE"), user terminals, a device, or by other terminology used in the art. The remote units 105 may communicate directly with one or more of the base units 110 via uplink ("UL") and downlink ("DL") communication signals. Furthermore, the UL and DL communication signals may be carried over the wireless communication links 115.

The base units 110 may be distributed over a geographic region. In certain embodiments, a base unit 110 may also be referred to as an access terminal, an access point, a base, a base station, a Node-B, an eNB, a gNB, a Home Node-B, a relay node, a device, or by any other terminology used in the art. The base units 110 may serve a number of remote units 105 within a serving area, for example, a cell or a cell sector via a wireless communication link 115. The base units 110 may communicate directly with one or more of the remote units 105 via communication signals.

Generally, the base units 110 transmit DL communication signals to serve the remote units 105 in the time, frequency, and/or spatial domain. Furthermore, the DL communication signals may be carried over the wireless communication links 115. The wireless communication links 115 may be any suitable carrier in licensed or unlicensed radio spectrum. The wireless communication links 115 facilitate communication between one or more of the remote units 105 and/or one or more of the base units 110.

The base units 110 are generally part of a radio access network ("RAN"), such as the access network 120, that may include one or more controllers communicably coupled to one or more corresponding base units 110. These and other elements of the radio access network are not illustrated, but are well known generally by those having ordinary skill in the art. The base units 110 connect to a mobile core network (e.g., in the visited network 130) via the access network 120.

In one embodiment, the mobile core network is a 5G core ("5GC") or the evolved packet core ("EPC"), which may be coupled to a data network 150, like the Internet and private data networks, among other data networks. Each mobile core network belongs to a single public land mobile network ("PLMN"). The present disclosure is not intended to be limited to the implementation of any particular wireless communication system architecture or protocol.

The mobile core network includes several network functions ("NFs"), including control plane functions (such as the AAA function 132) and user plane functions. As understood in the art, a mobile core network may include such control plane functions as an Access and Mobility Management Function ("AMF"), a Session Management Function ("SMF"), a Policy Control Function ("PCF"), and the Authentication, Authorization, and Accounting ("AAA") function 132.

The home network 140 is a "home" of the remote unit 105 roaming in the visited network 130. As such, the remote unit 105 is a subscriber of the home network 140 and has an account with the home network 140. As depicted, each of the visited network 130 and the home network 140 maintains an AAA function 132, used to authenticate remote units 105 seeking services in the mobile communication networks. The visited network 130 communicates with the home network 140 via the data network 150.

Typically, a roaming agreement is needed between the home network 140 and the visited network 130 in order for the visited network to provide services to the roaming remote unit 105. However, the wireless communication system leverages the blockchain network 160 to allow access authorization of a remote unit 105 in the visited network 130 without requiring a pre-established roaming agreement between the visited network 130 and the home network 140 of the remote unit 105.

As depicted, the blockchain network 160 is a peer-to-peer network that maintains a secure shared ledger 166, which is a list of transactions that have occurred in the past. This list of transactions is organized into blocks linked together, thus the name "blockchain." The blockchain network 160 is composed of multiple (typically thousands) of blockchain nodes 164, every one of which maintains a copy of the shared ledger 166. Note that the blockchain network 160 contains a single ledger 166 shared among the nodes 164 of the blockchain network 160.

Some blockchains, as the blockchain network 160 depicted, support so called "smart contracts." A smart contract is small program that is stored as part of the shared ledger 166 in all nodes 164 of the blockchain network 160. Typically, a smart contract 162 executes when prescribed conditions are met, e.g., when it receives some funds. In response, the smart contract 162 can perform various actions, such as returning information (here a connection information package) to the sender of the funds, invoke other smart contracts, etc. Note that the smart contract 162 is essentially a distributed application: it exists in all blockchain nodes 164 and it is executed simultaneously in all blockchain nodes 164. One advantage of such distributed application is improved security as it is almost impossible to hack a smart contract 162 because a hacker would have to change the contents of the shared ledger 166 in the majority of blockchain nodes 164.

Deployment of a smart contract 162 is typically done by sending a blockchain transaction to an empty address in the blockchain network 160 with the smart contract byte code as data. Note that the byte code is the code created after compiling the source code of the smart contract. Here, the smart contract 162 provides a (e.g., temporary) roaming agreement between the visited network 130 and the home network 140.

Each of the visited network 130 and home network 140 interface with the blockchain network 160 via the AAA function 132. In certain embodiments, the AAA function includes an external blockchain application, as discuss in greater detail below. The AAA function 132 in the visited network 130 can establish communication with the corresponding AAA function 132 in the home network 140 via the data network 150; however, the AAA function 132 only accepts connections from AAA functions 132 holding a valid connection information package. For example, a connection information package may include a validity parameter, such as an expiration date/time or number of uses remaining. If the AAA function 132 receives a connection request that uses an expired connection information package, then the AAA function 132 rejects the request.

The AAA function 132 in the visited network 130 acquires a connection information package by sending funds to a smart contract 162 in the blockchain network 160; the smart contract 162 issuing a connection information package after confirming payment. The connection information packages paid for and received by the visited network 130 are stored in a connection information package storage 136. The connection information packages issued by the smart contract 162 of the home network 140 are also stored in a connection information package storage 146. In some embodiments, a AAA function 132 deletes a connection information package from the respective connection information package storage 136, 146 in response to the connection information package expiring or otherwise becoming invalid. Also, the home network 140 has subscription data 144 which contains the subscription information of all its subscribers, including information required to authenticate these subscribers.

Figure 2:
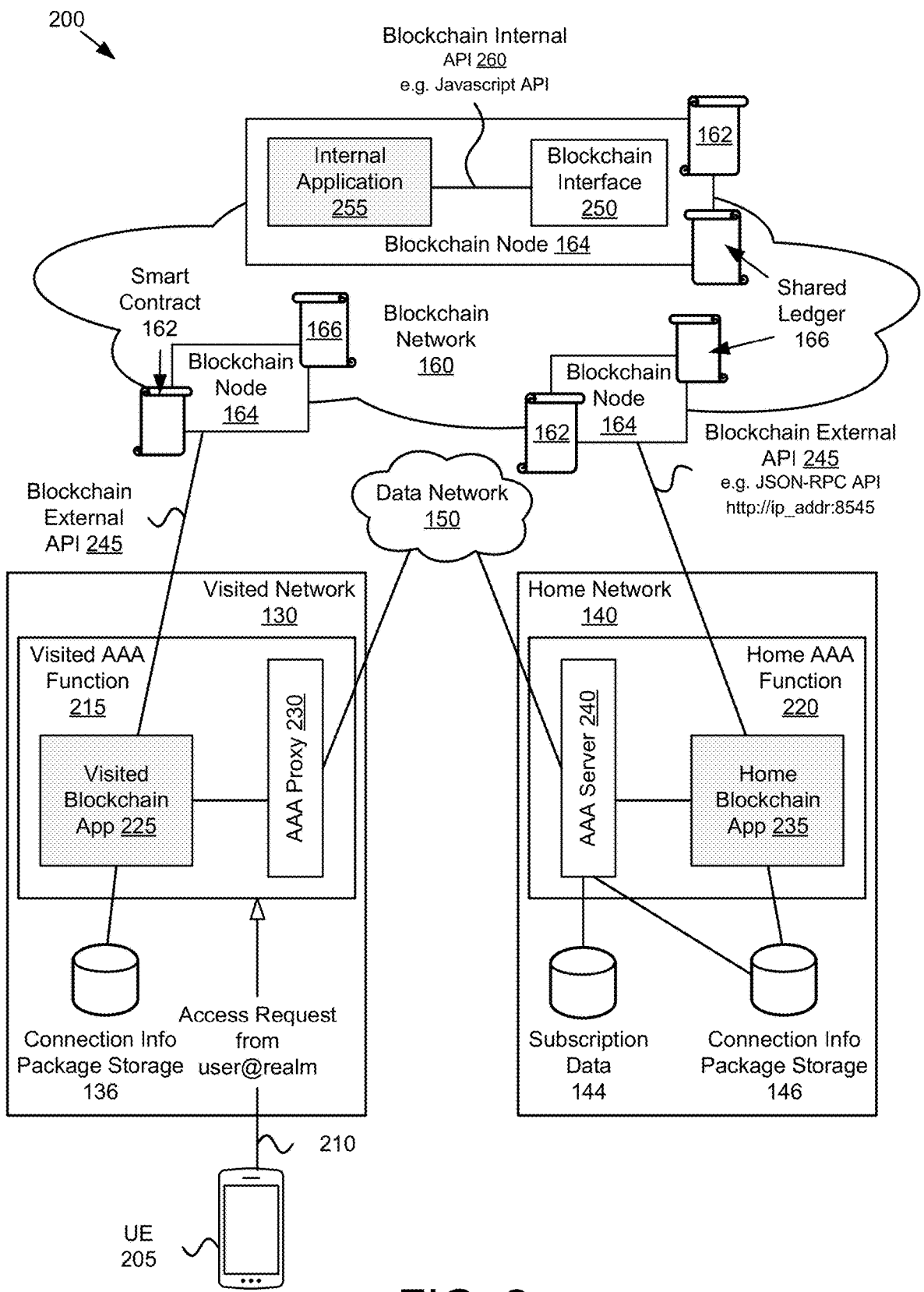
FIG. 2 is a block diagram illustrating a blockchain network for using a connection information package from a blockchain network to authenticate a user in a visited network via an authentication server in the home network.

FIG. 2 depicts a network architecture 200 used for using a connection information package from a blockchain network to authenticate a user in a visited network via an authentication server in the home network, according to embodiments of the disclosure. The network architecture 200 may be a simplified embodiment of the wireless communication system 100. As depicted, the network architecture 200 includes a UE 205 that is roaming in the visited network 130, a home network 140, and a blockchain network 160. Here, the UE 205 may be one embodiment of the remote unit 105, discussed above.

As depicted, the visited network 130 includes a visited AAA function ("VAF") 215. Here, the VAF 215 is one embodiment of the AAA function 132 discussed above. Additionally, the home network 140 includes a home AAA function ("HAF") 220. The HAF 220 is also one embodiment of the AAA function 132. Note that a mobile communication network may have a single AAA function 132 that acts both as a VAF 215 for a visiting (e.g., roaming) UE and as a HAF 220 for a home (e.g., non-roaming) UE. As such, the AAA function 132 may combine the elements in the VAF 215 and the HAF 220, described in detail below.

As shown in FIG. 2, the VAF 215 and the HAF 220 each contain blockchain application, here the Visited blockchain application ("VBA") 225 and the Home blockchain application ("HBA") 235, respectively. Both the VBA 225 and the HBA 235 are deployed as "external" blockchain applications with respect to the blockchain network 160. The HBA 235 interfaces with the blockchain network via the blockchain external Application Programming Interface ("API") 245 and is responsible to deploy the smart contract 162. Moreover, the HBA 235 receives notifications from the smart contract 162 whenever funds are transferred to the smart contract 162 and a connection information package is issued. All the connection information packages issued by the smart contract 162 are reported to the HBA 235, which then stores them in the connection information package storage 146.

The VBA 225 interfaces with the blockchain network 160 and is responsible to transfer funds to the smart contract 162 whenever it needs to connect to the HAF 220 and has no valid connection information package to enable this connection. The VBA 225 may request multiple connection information packages, each one from a different home network 140. This may be required to enable the visited network 130 to support roaming users from multiple different home networks 140. The connection information packages received by the visited network 130 (e.g., by the VBA 225) are stored in the connection information package storage 136.

Note that an AAA function 132 may differentiate between "visited" connection information packages it has purchased when acting as a VAF 215 and "home" connection information packages it has received from a smart contract 162 is has deployed in the blockchain network 160. In some embodiments, the AAA function 132 deletes connection information packages from the storage in response to the connection information packages expiring or otherwise becoming invalid.

The blockchain network 160 provides APIs that can be used by applications to interact with the blockchain. As an example, an application may use an API call to trigger a blockchain transaction via the blockchain interface 250, e.g. to transfer some funds to an account, or to be notified when his/her account receives new funds. As depicted, applications using the blockchain interface 250 via appropriate APIs can be external to a blockchain node 164, such as the VBA 225 and HBA 235, or an internal application 255 located in a blockchain node 164. In some embodiments, the blockchain network 160 supports an external API 245 (e.g., a JavaScript™ Object Notation Remote Procedure Call ("JSON-RPC") API) for use by external applications and a separate internal API 260 (e.g., a JavaScript™ API) for use by the internal applications 255.

Recall that the smart contract 162 is deployed in all nodes 164 in the blockchain network 160. It is also assumed that the home network 140 (e.g., the HBA 235) is configured to listen to the events emitted by the smart contract 162. Each of these events includes a connection information package issued by the smart contract 162.

The VAF 215 includes an AAA proxy 230 used to contact the AAA server 240 in the home network 140 in order to authenticate a UE 205 that attempts to roam in the visited network 130. Here, the UE 205 sends an access request 210 that includes a username and home realm of the UE 205 (depicted here as "user@realm"). If the VAF 215 does not have a valid connection information package for the home network 140 corresponding to the realm, then the VBA 225 will initiate a blockchain transaction with the smart contract 162 deployed by the home network 140 corresponding to the realm (e.g., in order to purchase a connection information package). Thereafter, the AAA proxy 230 will use the connection information package to connect to the AAA server 240, in order to authenticate the UE 205.

Figure 3:
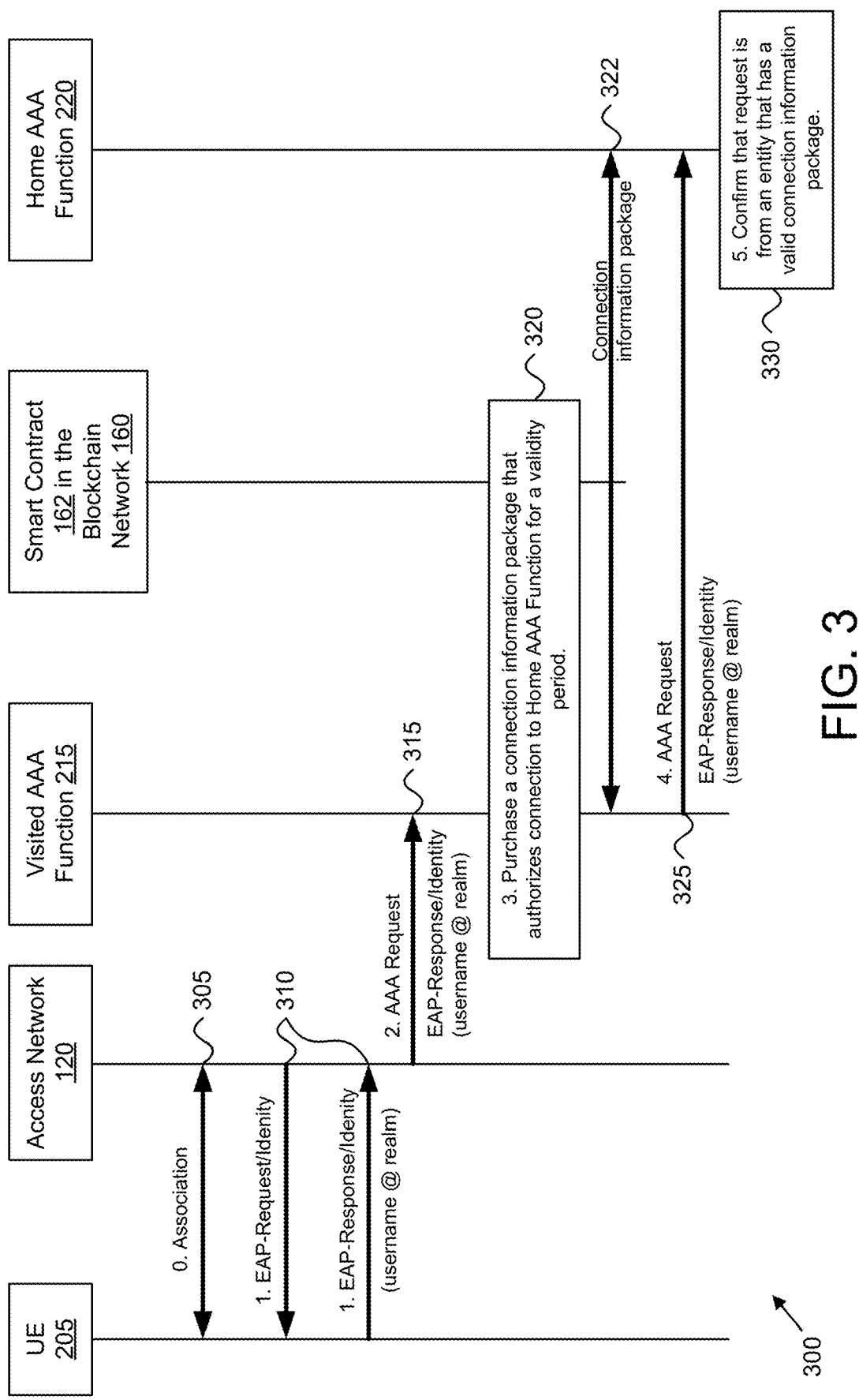
FIG. 3 is a block diagram illustrating one embodiment of a network procedure for user authentication using a connection information package provided by a blockchain network.

FIG. 3 depicts a network procedure 300 for user authentication using a connection information package provided by a blockchain network, according to embodiments of the disclosure. The network procedure 300 involves the UE 205, an access network 120, the VAF 215 (residing in the visited network 130), the HAF 220 (residing in the home network 140), and the smart contract 162 in the blockchain network 160. The network procedure 300 does not require a roaming agreement between the visited network 130 and the home network 140. Here, the network procedure 300 illustrates how the roaming user (the UE 205) is able to access a visited network that does not have a roaming agreement with the user's home network.

The network procedure 300 begins as the UE 205 attempts to access the visited network via the access network 120. Here, the UE 205 associates with the access network 120 (e.g., a WLAN access point) at which point the access network 120 initiates an EAP-based authentication procedure (see signaling 305 and 310). Here, the access network 120 requests the identity (e.g., a Network Access Identifier ("NAI")) of the UE 205 and the UE 205 provides a username and realm in response (refer to signaling 310). The access network 120 then sends an AAA Request to the AAA function in the visited network, here the VAF 215 (see signaling 315).

When the visited network (e.g., the VAF 215) receives the access request from the roaming user, the VAF 215 performs an online payment by using a blockchain network 160, also referred to as a blockchain service platform. In a typical case, the VAF 215 transfers some digital currency to a certain smart contract 162 that has been deployed by the home mobile network in the blockchain, in order to purchase a connection information package that authorizes connection to the HAF 220 for a validity period (see block 320). Note here, that the validity period (or number of times a connection information package can be used) may be tied to the payment amount. Here, a larger payment results in a longer validity period (or larger number of times a connection information package can be used), while a smaller payment results in a smaller validity period (or smaller number of times a connection information package can be used).

When the smart contract 162 in the blockchain network 160 confirms the payment, the smart contract 162 issues a new connection information package which is made available to both the VAF 215, which made the payment, and to the HAF 220, which owns the smart contract 162 that received the payment (see signaling 322). This connection information package authorizes the VAF 215 to connect to the HAF 220 and to request the authentication of the roaming UE 205.

Prior to issuing this connection information package, any attempt by the VAF 215 to connect to the HAF 220 is rejected. After issuance of the connection information package, the VAF 215 makes a connection to the HAF 220 using the connection information package and forwards the AAA Request to the HAF 220 (see signaling 325). The HAF 220 accepts the connection upon confirming that the VAF 215 owns a valid connection information package (see block 330). However, the HAF 220 rejects a connection request that uses an expired or otherwise invalid connection information package.

With the network procedure 300, there is no need for a pre-established roaming agreement and for extensive network configuration. The network procedure 300 enables a type of "temporary roaming agreement" that is implemented as a smart contract 162 in a blockchain network 160. To enter into the temporary roaming agreement, the visited network 130 (e.g., via the VAF 215) makes a secure and fast online payment and receives a connection information package that permits it access to an authentication server in the home network 140. Moreover, the authentication server in the home network 140 accepts connection requests only from entities that have paid to obtain a connection information package.

Figure 4:
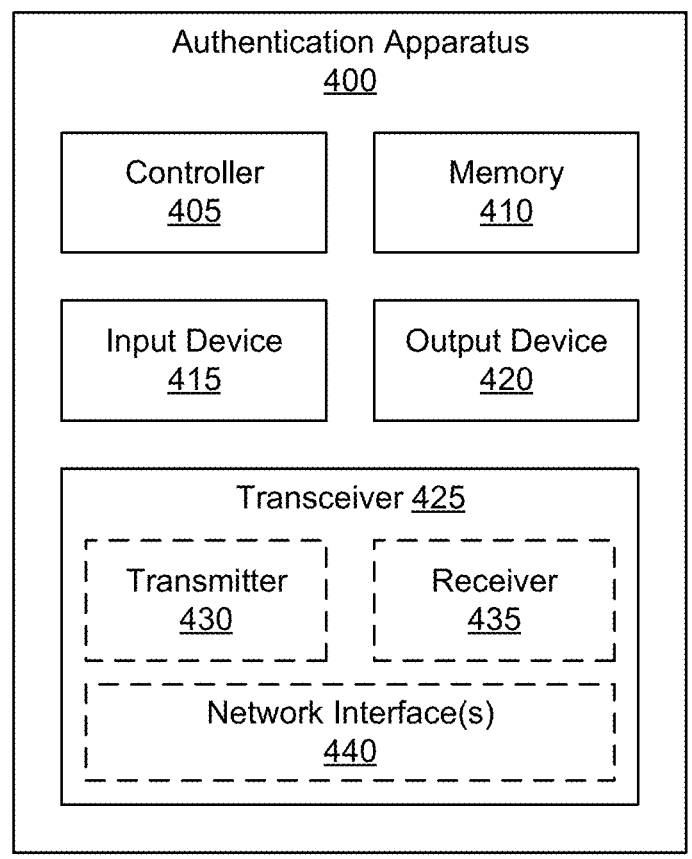
FIG. 4 a schematic block diagram illustrating one embodiment of a network function apparatus for using a connection information package from a blockchain network to authenticate a user in a visited network via an authentication server in the home network.

FIG. 4 depicts one embodiment of an authentication apparatus 400 that may be used for using a connection information package from a blockchain network to authenticate a user in a visited network via an authentication server in the home network, according to embodiments of the disclosure. The authentication apparatus 400 may be one embodiment of the AAA function 132. Furthermore, the authentication apparatus 400 may include a processor 405, a memory 410, an input device 415, a display 420, and a transceiver 425. In some embodiments, the input device 415 and the display 420 are combined into a single device, such as a touch screen. In certain embodiments, the authentication apparatus 400 may not include any input device 415 and/or display 420.

As depicted, the transceiver 425 includes at least one transmitter 430 and at least one receiver 435. Additionally, the transceiver 425 may support at least one network interface 440. Here, the network interface 440 facilitates communication with one or more network function. Additionally, the at least one network interface 440 may include an interface used for communications with an external application server.

The processor 405, in one embodiment, may include any known controller capable of executing computer-readable instructions and/or capable of performing logical operations. For example, the processor 405 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 405 executes instructions stored in the memory 410 to perform the methods and routines described herein. The processor 405 is communicatively coupled to the memory 410, the input device 415, the display 420, and the transceiver 425.

In some embodiments, the authentication apparatus 400 operates as a VAF 215 of a remote unit 105, such as the UE 205. In such embodiments, the transceiver 425 receives a request to authenticate a user (e.g., the remote unit 105 or UE 205). Here, the request contains a username and a realm (e.g., a home realm of the user), for example in the form of a NAI. In response to the request, the processor 405 identifies a first address on a blockchain network 160, the first address corresponding to the realm, and sends (e.g., by controlling the transceiver 425) a message to the first address on the blockchain network 160. Here, the message contains a payment, such as a transfer of a blockchain payment from an address on the blockchain network 160 belonging to the authentication apparatus 400 (e.g., from a second blockchain address) to the first address. This payment may be a transfer of funds, currency, cryptocurrency, assets (e.g., digital assets), or the like.

In various embodiments, the first address may point to a smart contract 162 that performs a computing function in response to the message. Here, the smart contract 162 may be executable code stored in the shared ledger 166 of the blockchain network 160. The smart contract 162 implements a contract between the sender (e.g., the authentication apparatus 400) and the owner or operator of the realm associated with the smart contract 162. Note that the smart contract 162 is visible to all users of the blockchain network 160. Recall that the blockchain network 160 contains a single ledger shared among the nodes of the blockchain network 160.

The message containing the payment causes the blockchain network 160 to insert the transaction into the blockchain's shared ledger 166 and to generate a connection information package, e.g., in response to confirming the payment. The connection information package is associated with both the first address (e.g., pointing to the smart contract 162) and with the realm. Additionally, a copy of the connection information package is sent to both the authentication apparatus 400 (e.g., as a response to the message containing the payment) and to an authentication server in the realm associated with the first address. The authentication apparatus 400 uses the connection information package to establish a connection with the authentication server (e.g., the AAA server 240 the home realm of the user). Having established the connection to the authentication server, the authentication apparatus 400 authenticates the user (e.g., via the authentication server in the realm). As discussed above, the authentication server may be a part of a AAA function (e.g., the HAF 220) in the home network of the user (e.g., the UE 205).

In some embodiments, the processor 405 identifies the first address on the blockchain network (e.g., the first blockchain address) by mapping the realm to an address on the blockchain network using a preconfigured table. In other embodiments, the processor 405 identifies the first blockchain address by sending a Domain Name System ("DNS") request (or query), the DNS request including the realm, and receiving a DNS response, the DNS response including the first address on the blockchain network. In further embodiments, the processor 405 first checks the preconfigured table for a mapping and sends the DNS request if the table does not include a mapping for the realm. Moreover, the processor 405 may update the preconfigured table upon receiving the DNS response.

In some embodiments, the message sent to the first blockchain address contains input data, including a network address of the authentication apparatus 400 (referred to as a first network address). Here, the first network address may be an internet protocol ("IP") address of the authentication apparatus 400 or a hostname of the authentication apparatus 400. Moreover, in response to the message including the first network address, the blockchain network (e.g., the smart contract 162) associates the connection information package with the first network address. For example, the first network address may be included in the connection information package. Note that the connection information package is also associated with the realm.

In certain embodiments, the input data sent in the message to the first blockchain address includes a public key of the authentication apparatus 400. Here, the public key allows for improved security using the connection information packages, as discussed below with reference to FIG. 5B.

In one embodiment, the processor 405 establishes the connection to the authentication server in the realm using the first network address (e.g., sends from the first network address). The authentication server, in turn, verifies that the connection request is received from the same network address as included in the connection information package. Moreover, the connection information package may include contact information pertaining to the authentication server, such as an IP address of the authentication server, a hostname of the authentication server, a protocol to be used to contact the authentication server, and/or a port to be used to connect to the authentication server in the realm. In certain embodiments, establishing the connection with the authentication server includes sending a request message to the authentication server, the request message comprising a reference to the connection information package and a message authentication code computed with a private key associated with the public key of the apparatus.

In some embodiments, the connection information package includes a validity parameter. In such embodiments, the authentication server verifies that the connection information package is valid prior to accepting a connection request from the authentication apparatus 400. In one embodiment, the validity parameter is an expiration time and date. Here, the connection information package becomes invalid after the expiration time and date. In another embodiment, the validity parameter is an indicator of a permitted number of authentication requests using the connection information package. Here, the connection information package becomes invalid after being used the permitted number of times. In certain embodiments, the validity parameter may include both an expiration time/date and a permitted number of authentication requests. In some embodiments, the validity period (or number of times a connection information package can be used) may be tied to the payment amount. Here, a larger payment results in a longer validity period (or larger number of times a connection information package can be used), while a smaller payment results in a smaller validity period (or smaller number of times a connection information package can be used).

In some embodiments, the authentication apparatus 400 operates as a HAF 220 of a remote unit 105, such as the UE 205. In such embodiments, the processor 405 receives (via the transceiver 425), from the first address in the blockchain network 160 (e.g., the address belonging to the smart contract 162), a plurality of connection information packages. Here, each connection information package created in response to a message sent to the first address in the blockchain network 160, the message including a payment to the first address in the blockchain and a network address that is to be associated with (e.g., inserted into) the connection information package.

Note that the first address in the blockchain network 160 is the address belonging to the smart contract 162 corresponding to the realm in which the authentication apparatus 400 resides. Here, the payment triggers the smart contract 162 to generate and distribute a connection information package. For example, the smart contract 162 may send the generated connection information package in response to the payment being inserted into a shared ledger 166 of the blockchain network 160. Recall that the blockchain network 160 contains a single ledger shared among the nodes of the blockchain network 160.

Moreover, the processor 405 receives (via the transceiver 425) a request to authenticate a user from a first function (e.g., an AAA function in a visited network). In response to the request to authenticate the user, the processor 405 first determines whether the first function is associated with one of the plurality of connection information packages. In certain embodiments, the processor 405 further confirms that the associated connection information package is (still) valid. Then, in response to the first function being associated with a valid one of the plurality of connection information packages, the processor 405 accepts the request to authenticate the user. As used here, accepting the request to authenticate refers to the processor 405 determining to initiate an authentication procedure (e.g., EAP-based authentication), as described in further detail below.

In some embodiments, each connection information package comprises a network address of a corresponding function permitted to use the connection information package and a realm of the apparatus, referred to as a first network address. The first network address may be an IP address or a hostname of the corresponding function.

Moreover, the request to authenticate a user may be received from a second network address (e.g., an IP address belonging the first function). In such embodiments, the processor 405 determines whether the first function is associated with a connection information package by determining whether the second network address matches the network address included in (or otherwise associated with) a particular connection information package. Where the first network address is a hostname, the processor 405 may also resolve the hostname into a first IP address and determine whether the IP address associated with the authentication request (e.g., the second IP address) matches the first IP address. Note that the processor 405 will reject the authentication request if the first function is not associated with any valid connection information package.

In certain embodiments, each connection information package may include a validity parameter, such as an expiration date/time and/or a maximum number of uses. Here, the processor 405 checks the validity of the connection information package when determining whether the first function is associated with one of the stored connection information packages. In addition, each connection information package may further include a public encryption key of the corresponding function. Moreover, the processor 405 may track the number of times a connection information package has been used and update the usage number for the associated connection information package after accepting the request to authenticate a user. In various embodiments, the processor 405 deletes connection information packages in response to the connection information packages expiring or otherwise becoming invalid.

In some embodiments, the request to authenticate a user include a package identifier and a message authentication code. Here, the message authentication code is computed based on the private key of the first function. The processor 405 retrieves the particular connection information package indicated by the package identifier. From the indicated connection information package, the processor 405 obtains the public key of the function corresponding to the connection information package. If the processor 405 is successfully able to decode the message authentication code using the retrieves public key, then the processor 405 has confirmed the authenticity of the authentication request and verifies that the first function is associated with the connection information package (e.g., is permitted to connect to the authentication apparatus 400 using the connection information package).

The memory 410, in one embodiment, is a computer readable storage medium. In some embodiments, the memory 410 includes volatile computer storage media. For example, the memory 410 may include a RAM, including dynamic RAM ("DRAM"), synchronous dynamic RAM ("SDRAM"), and/or static RAM ("SRAM"). In some embodiments, the memory 410 includes non-volatile computer storage media. For example, the memory 410 may include a hard disk drive, a flash memory, or any other suitable non-volatile computer storage device. In some embodiments, the memory 410 includes both volatile and non-volatile computer storage media. In some embodiments, the memory 410 stores data relating to using a connection information package from a blockchain network to authenticate a user in a visited network via an authentication server in the home network, for example storing network addresses, blockchain addresses, connection information packages, and the like. In certain embodiments, the memory 410 also stores program code and related data, such as an operating system or other controller algorithms operating on the authentication apparatus 400 and one or more software applications.

The input device 415, in one embodiment, may include any known computer input device including a touch panel, a button, a keyboard, a stylus, a microphone, or the like. In some embodiments, the input device 415 may be integrated with the display 420, for example, as a touchscreen or similar touch-sensitive display. In some embodiments, the input device 415 includes a touchscreen such that text may be input using a virtual keyboard displayed on the touchscreen and/or by handwriting on the touchscreen. In some embodiments, the input device 415 includes two or more different devices, such as a keyboard and a touch panel.

The display 420, in one embodiment, may include any known electronically controllable display or display device. The display 420 may be designed to output visual, audible, and/or haptic signals. In some embodiments, the display 420 includes an electronic display capable of outputting visual data to a user. For example, the display 420 may include, but is not limited to, a liquid crystal display ("LCD"), an light-emitting diode ("LED") display, an organic LED ("OLED") display, a projector, or similar display device capable of outputting images, text, or the like to a user. As another, non-limiting, example, the display 420 may include a wearable display such as a smart watch, smart glasses, a heads-up display, or the like. Further, the display 420 may be a component of a smart phone, a personal digital assistant, a television, a table computer, a notebook (e.g., laptop) computer, a personal computer, a vehicle dashboard, or the like.

In certain embodiments, the display 420 includes one or more speakers for producing sound. For example, the display 420 may produce an audible alert or notification (e.g., a beep or chime). In some embodiments, the display 420 includes one or more haptic devices for producing vibrations, motion, or other haptic feedback. In some embodiments, all or portions of the display 420 may be integrated with the input device 415. For example, the input device 415 and display 420 may form a touchscreen or similar touch-sensitive display. In other embodiments, the display 420 may be located near the input device 415.

The transceiver 425 communicates with one or more network functions of a mobile communication network. The transceiver 425 operates under the control of the processor 405 to transmit messages, data, and other signals and also to receive messages, data, and other signals. For example, the processor 405 may selectively activate the transceiver (or portions thereof) at particular times in order to send and receive messages. The transceiver 425 may include one or more transmitters 430 and one or more receivers 435. As discussed above, the transceiver 425 may support one or more the network interface 440 for communicating with the base unit 110.

Figure 5A:
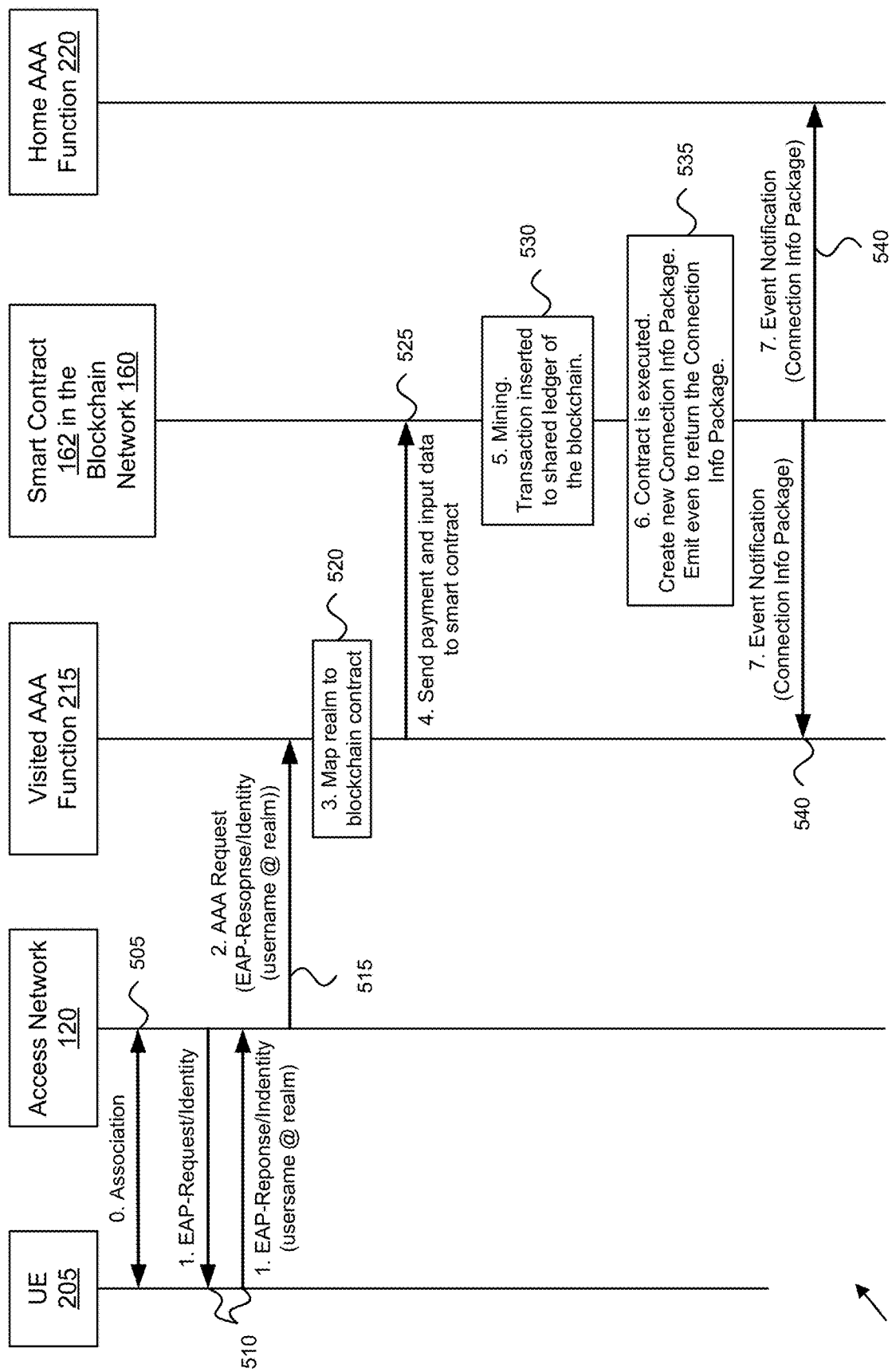
FIG. 5A is a block diagram illustrating another embodiment of a network procedure for user authentication using a connection information package provided by a blockchain network.
Figure 5B:
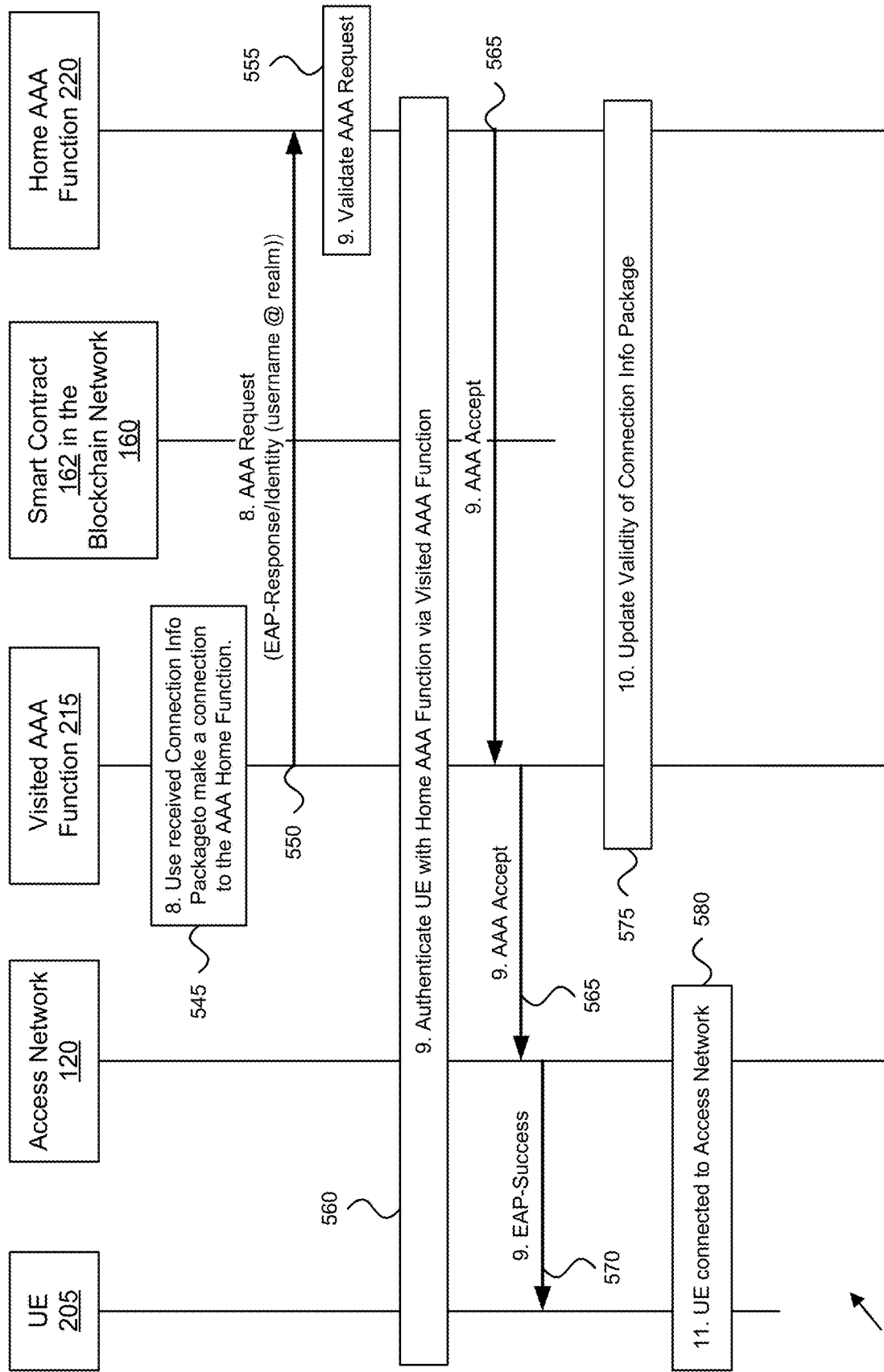
FIG. 5B is a continuation of the network procedure of FIG. 5A.

FIGS. 5A-5B depict a network procedure 500 for user authentication using a connection information package provided by a blockchain network, according to embodiments of the disclosure. The network procedure 500 is one embodiment the network procedure 300, described above. The network procedure 500 involves the UE 205, an access network 120, the VAF 215 (residing in the visited network 130, not shown here), the HAF 220 (residing in the home network 140, not shown here), and the smart contract 162 in the blockchain network 160. In the network procedure 500, the UE 205 uses an access network 120 associated with the visited network 130 (e.g., the UE 205 attempts to roam in the visited network 130). Here, there is no roaming agreement between the visited network 130 and the home network 140.

Note, that the network procedure 500 assumes that there is initially no valid connection information package for the VAF 215 to use to contact the HAF 220. Moreover, the network procedure 500 also assumes that the home network 140 has created a smart contract 162 on the blockchain network 160 before the network procedure 500 begins. It is further assumed that the HAF 220 (e.g., the HAB 235) is configured to listen to the events emitted by the smart contract 162, each event including a connection information package.

At FIG. 5A, the network procedure 500 begins with the UE 205 selecting an access network 120 (e.g., a WLAN access point) and initiating association with the selected access network 120 (see signaling 505). After association, the UE 205 and the access network 120 begin an authentication procedure. In the depicted embodiments, the UE 205 and access network 120 use an authentication procedure based on the Extensible Authentication Protocol ("EAP"); however, other authentication procedures may be used in other embodiments.

In the authentication procedure, the access network 120 requests the UE's identity and the UE 205 responds by providing its NAI, which includes a realm name and a username (see signaling 510). The depicted NAI is in the form "username@realm;" however, in other embodiments the NAI may use other syntax. The "realm" includes the domain name of the home network 140, which holds the valid subscription of the user (e.g., the UE 205) and can be used to authenticate the user.

The access network 120 forwards the EAP response (containing the NAI of the UE 205) to the VAF 215 in an AAA Request message (see signaling 515). Generally, when the VAF 215 received an AAA Request message for a roaming user, the VAF 215 forwards the AAA Request to the home AAA function of the user's realm. In the network procedure 500, however, the VAF 215 determines that it cannot contact the Home AAA Function ("HAF") 220 in the home network 140 of the UE 205 because the VAF 215 does not have valid credentials (e.g., a valid connection information package) for the HAF 220. In one embodiment, the lack of connection information package for the realm included in the NAI triggers an internal signal to the VBA 225 (not shown here) which requests (e.g., to purchase) a connection information package for the UE's realm (e.g., for the HAF 220 in the UE's home network 140).

As discussed above, the connection information package serves as an authorization to connect to the HAF 220, e.g., in order to forward the AAA request message. Moreover, the connection information package may include contact information for the HAF 220, such as hostname (or IP address) protocol, port, etc., for contacting the HAF 220.

To acquire a valid connection information package, the VAF 215 first maps the realm in the NAI to an address in the blockchain network 160 (see block 520). This address points to a smart contract (e.g., the smart contract 162) capable of providing a connection information package for the home network 140. In various embodiments, the VBA 225 maps the realm to a blockchain address. The blockchain address of the smart contract 162 is typically a long pseudo-random character string, for example the string 0x888666CA69E0f178DED6D75b5726Cee99A87D698.

In some embodiments, the VAF 215 uses a preconfigured mapping table to identify the blockchain address from the realm. Here, the preconfigured mapping table may contain a list of supported realms and a blockchain address for a smart contract associated with each realm. In other embodiments, the VAF 215 maps the realm to a blotting address by sending a DNS request to a DNS server. For example, if the preconfigured mapping table lacks an entry for the realm included in the NAI of the UE 205, then the VAF 215 sends the DNS request to retrieve the blockchain address of the smart contract for the realm. Note that the DNS request may be a special DNS request used to resolve realms into smart contract addresses (e.g., in the blockchain network 160).

After identifying the blockchain address of the smart contract 162 associated with the realm, the VAF 215 (e.g., the VBA 225) makes a call to the blockchain network (e.g., using the appropriate blockchain API) to initiate a new blockchain transaction. To initiate the block train transaction, the VAF 215 makes a payment to the smart contract address and provides input data, including the IP address (or hostname) of the VAF 215 (see signaling 525). In various embodiments, the payment may be a transfer of funds, an assignment of digital assets (such as cryptocurrency tokens), and the like. This transaction may be digitally signed using a private encryption key belonging to the VAF 215.

Like all blockchain transactions, nodes inside the blockchain network 160 confirm that the receive transaction is valid and signed by an entity possessing the right private key. This new transaction goes to the normal mining process and is committed to the blockchain, e.g., by insertion into the shared ledger 166 (see block 530). Note that in the network procedure 500 it is important that the mining process is completed in a short period; otherwise, the entire authentication of the UE 205 may be considerably delayed. Hence, the transaction preferably involves a blockchain with a short mining period.

In various embodiments, the transaction between the VAF 215 in the smart contract 162 in the blockchain network 160 may contain the following information: a digital signature (e.g., TxHash), a time step, the network address of the sender (e.g., the IP address or hostname of the VAF 215), an address of the recipient (e.g., the blockchain address of the smart contract 162), a value/payment (e.g., transferred funds or crypto currency tokens), and input data (including a function of the smart contract 162 to invoke, and input data such as the network address of the VAF 215, the public key of the VAF 215, and the like).

After sending the request for a new blockchain transaction, the VBA 225 of the VAF 215 configures the underlying blockchain network 160 to report events emitted by the smart contract 162. Such events are important because they provide the means for the smart contract 162 to return some information to the VAF 215. Note that any blockchain node 164 in the blockchain network 160 can monitor events emitted by a smart contract 162.

After receiving the funds from the VAF 215, the smart contract 162 programming is executed, thereby creating a new connection information package (see block 535). This is performed by executing code inside the smart contract 162, e.g., corresponding to the function invoked in the message from the VAF 215. In various embodiments, the smart contract 162 creates a connection information package which contains the following information: a connection package identification, a network address of the authorized user (e.g., the VAF 215), a validity parameter, access credentials, and contact information for the HAF 220. Note that the connection package identification may uniquely identify the connection information package and is used for logging purposes. The network address of the authorized user may be an IP address or hostname. The validity parameter may be an expiration time/date. Alternatively, the validity parameter may be a "count number" indicating a maximum number of times the connection information package may be used before expiring. The contact information may include a network address (IP address or hostname) a communication protocol, a port, or the like for communicating with the HAF 220. In certain embodiments, the connection information package also contains the public key of the VAF 215 (e.g., assuming the public key was included as input data).

After creating the connection information package, the smart contract 162 emits an event which contains the created connection information package (see signaling 540). As a result, both the VAF 215 and the HAF 220 receive a copy of the created connection information package. Both functions save the new connection information package in their respective connection information package storages (i.e., connection information package storages 136 and 146). Note that the created connection information package may also be received by any other blockchain app application that monitors the events emitted by the smart contract 162. However, a particular connection information package can be used only by a visited AAA function that possesses the IP address or hostname included in the connection information package. In various embodiments, additional security measures may be taken as discussed below.

Continuing at FIG. 5B, after receiving the connection information package, the VAF 215 establishes a connection with a home AAA server (e.g., in the HAF 220) using the connection information package (see block 545). For example, the VBA 225 may instruct the AAA proxy 230 to forward the AAA Request to the AAA server 240. In some embodiments, the VAF 215 uses the "Contact" information in the connection information package to identify and contact the HAF 220. Alternatively, if the connection information package does not contain the "Contact" information, then the VAF 215 may use a DNS query to discover the AAA server 240 for the provided username@realm, for example by using the DNS-Based Name Authority Pointer Secure Vector Routing ("NAPTR/SRV") Peer Discovery mechanism, as specified in the Internet Engineering Task Force ("IETF") Request for Comment ("RFC") 7585. In response to identifying the AAA server, the AAA proxy 230 in the VAF 215 makes the connection to the AAA server 240 in the HAF 220.

After making the connection, the VAF 215 forwards the AAA request (e.g., received in signaling 515) to the HAF 220 (see signaling 550). The VAF 215 sends the AAA Request in order to trigger the authentication procedure needed to authenticate the UE 205. The HAF 220 then validates the AAA Request (e.g., using the AAA server 240) (see block 555). In doing so, the HAF 220 confirms that the AAA Request comes from an IP address for which a valid connection information package exists in the connection information package storage 146. If the validation fails, then the AAA server 240 rejects the AAA Request, e.g., it denies authenticating the UE 205. However, if the validation succeeds, then the AAA server 240 accepts the AAA Request and performs an authentication procedure with the UE 205 (see block 560). Here, the authentication can be based on any EAP method according to the procedures known in the art. Upon successful authentication, the HAF 220 sends an AAA Accept message to the VAF 215, which forward the AAA Accept message to the access network 120 (see signaling 565). The access network 120 transmits a success indication (e.g., an EAP-Success message) to the UE 205 (see signaling 570).

After the authentication procedure completes (either successfully or not), both the VAF 215 and the HAF 220 update the "count number" in their connection information packages, if the connection information package includes a validity "count number" (see block 575). After successful authentication, the UE 205 is connected to the access network 120 (see block 580) and gains access to services in the visited network 130. Note that the VAF 215 and HAF 220 may delete connection information packages that have expired or otherwise become invalid.

In the network procedure 500, the HAF 220 uses the IP address of the VAF 215 as a key for validating an authentication request. Recall that the connection information package contains a network address belonging to the function permitted to use the connection information package. In some embodiments, the HAF 220 resolves a hostname in the connection information package into an IP address, in order to validate the AAA request. However, in other embodiments other types of validation may be supported.

Note that the connection information package emitted by the smart contract 162 needs to be readable by both the VAF 215 and the HAF 220. Accordingly, it is not possible to encrypt the connection information package by using the public key of VAF 215, as this would render the connection information package unreadable to all except the VAF 215. In certain embodiments, the smart contract 162 emits an unencrypted (e.g., plaintext) notification that is readable by all entities (e.g., the HAF and all VAFs) that monitor the smart contract notifications. In other embodiments, the smart contract 162 emits a notification containing two copies of the connection information package: a first copy encrypted with the public key of the VAF 215 and a second copy encrypted with the public key of the HAF 220. Here, although all entities would receive the notification, only the HAF 220 and the VAF 215 who made the payment would be able to read the info package.

In some embodiments, the AAA Request message sent to the HAF 220 (refer to signaling 550) may include a package identifier that points to a specific connection information package, as well as a message authentication code ("MAC") that is computed based on the private key of VAF 215. In such embodiments, the HAF 220 retrieves the public key of the VAF 215 from the referenced connection information package and confirms the authenticity of the MAC by using this public key. Here, a MAC that is decodable using the public key in the connection information package confirms that the MAC was computed by an entity having the right private key (e.g., the VAF 215 whose payment generated the connection information package).

When validating a AAA Request using the MAC, the message the VAF 215 sends to the smart contract 162 (refer to signaling 525) must include also the public key of the VAF 215. Moreover, the smart contract 162 must copy this public key into the created connection information package. From a security point of view, the MAC-based validation procedure is considered more secure than the IP Address based validation, because it makes sure that the AAA Request to the HAF 220 really comes from the entity that paid to receive the connection information package. However, implementing the MAC may require changes to the AAA protocol between the VAF 215 and the HAF 220. In contrast, validating the AAA request using only the IP Address does not require changes to the AAA protocol, but it may be less secure as it only confirms that the AAA Request sent to the HAF 220 comes from an entity using the same IP address as the one declared when making the payment for the connection information package (e.g., the network address associated with the connection information package).

Figure 6:
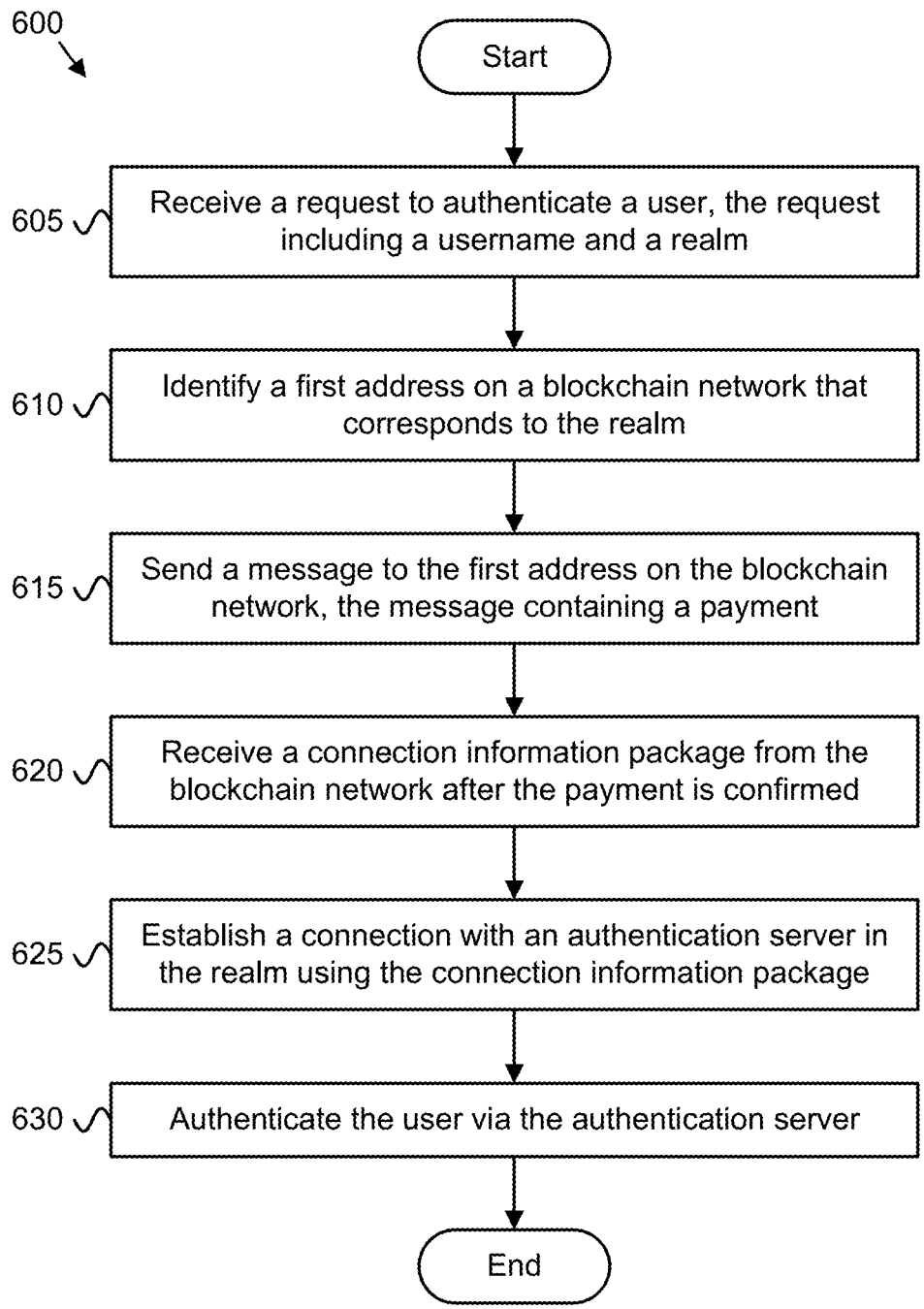
FIG. 6 is a schematic flow chart diagram illustrating one embodiment of a method for user authentication using a connection information package provided by a blockchain network.

FIG. 6 depicts a method 600 for using a connection information package from a blockchain network to authenticate a user in a visited network via an authentication server in the home network, according to embodiments of the disclosure. In some embodiments, the method 600 is performed by an apparatus, such as the AAA function 132, the VAF 215, and/or the authentication apparatus 400. In certain embodiments, the method 600 may be performed by a processor executing program code, for example, a microcontroller, a microprocessor, a CPU, a GPU, an auxiliary processing unit, a FPGA, or the like.

The method 600 begins and receives 605, at the network function, a request to authenticate a user, the request containing a username and a realm. For example, the username may identify a user account (or subscriber account) and the realm identifies a location of the user account. Here, the realm (also referred to as a realm name) may identify the home realm of the user.

The method 600 includes identifying 610 a first address on a blockchain network (e.g., a first blockchain address) that corresponds to the realm. In some embodiments, identifying 610 the first address on a blockchain network includes mapping the realm to an address (e.g., a blockchain address) using a preconfigured table. In other embodiments, identifying 610 the first blockchain address includes sending a DNS request, the request including the realm, and receiving a DNS response, the DNS response including the first address on the blockchain network. In certain embodiments, identifying 610 the first blockchain address includes first checking the preconfigured table for an entry corresponding to the realm and sending the DNS request if the preconfigured table does not include an entry corresponding to the realm.

The method 600 includes sending 615 a message to the first address on the blockchain network, the message containing a payment. In certain embodiments, the first address on a blockchain network points to a smart contract on the blockchain network. As described herein, the smart contract is executable code (e.g., a computer program) stored in a shared ledger of the blockchain network. When the message meets certain conditions (e.g., contains a payment and identifies the sender), then the smart contract issues a connection information package, as described below. Note that the blockchain network contains a single ledger shared among the nodes of the blockchain network.

In some embodiments, the payment contained in the message is a blockchain payment from a second address on the blockchain network to the first address on the blockchain network, the second blockchain address belonging to an operator of the network function. In certain embodiments, the message sent to the first address includes a public encryption key of the network function. In certain embodiments, the message sent to the first address also includes a first network address that belongs to the network function.

The method 600 includes receiving 620 a connection information package from the first address on the blockchain network after the payment is confirmed. In certain embodiments, receiving the connection information package from the first address on the blockchain network after payment confirmation includes receiving the connection information package in response to the payment being inserted into a shared ledger of the blockchain network.

As described above, the message may include a network address (e.g., first network address) belonging to the network function. Here, the first network address may be an IP address or a hostname of the network function. When included in the message, the connection information package may include a first network address (e.g., the IP address or hostname of the network function). The connection information package may further include a public key of the network function. Moreover, the connection information package is then associated with both the realm and the first network address. For example, the connection information package may become usable only by an entity using the first network address.

In some embodiments, the connection information package includes contact information of the authentication server, thereby indicating how the network function can contact the authentication server in the realm. In various embodiments, such contact information may include an IP address of the authentication server, a hostname of the authentication server, a protocol to be used to contact the authentication server, and/or a port to be used to connect to the authentication server.

In any of the above embodiments, the connection information package may include a validity parameter indicating a condition invalidating the connection information package. In one embodiment, the validity parameter includes an expiration time and date. In such an embodiment, the connection information package becomes invalid after the expiration time and date. In another embodiment, the validity parameter includes an indicator of a permitted number of authentication requests using the connection information package. In such an embodiment, the connection information package becomes invalid after being used the permitted number of times.

The method 600 includes establishing 625 a connection with an authentication server in the realm using the connection information package. Here, the connection with the authentication server in the realm is made using the first network address. In various embodiments, the authentication server only accepts a connection request made using the connection information package if the request is sent from a network address associated with the connection information package (e.g., the first network address belonging to the network function). In certain embodiments, establishing 625 the connection with the authentication server in the realm using the connection information package comprises sending a request message to the authentication server, the request message comprising a reference to the connection information package and a message authentication code computed with a private key associated with the public key of the network function.

The method 600 includes authenticating 630 the user via the authentication server in the realm and the method 600 ends. In any of the above embodiments, the authentication server in the realm may be an authentication, authorization, and accounting ("AAA") function in a home network of the user. Authenticating 630 the user may also include providing services to the user in response to successful authentication.

In some embodiments, each connection information package comprises a first network address of a corresponding function permitted to use the connection information package and a realm of the authentication function. The first network address may be an IP address and a hostname of the corresponding function. In certain embodiments, each connection information package further comprises a public encryption key of the corresponding function.

In some embodiments, at least one of the plurality of connection information packages includes a validity parameter. In certain embodiments, at least one connection information package includes, as the validity parameter, an expiration time and date of the corresponding connection information package. Here, the corresponding connection information package becoming invalid after the expiration time and date. In certain embodiments, at least one connection information package includes, as the validity parameter, an indicator of a permitted number of authentication requests using the corresponding connection information package. Here, the corresponding connection information package becoming invalid after being used the permitted number of times.

Figure 7:
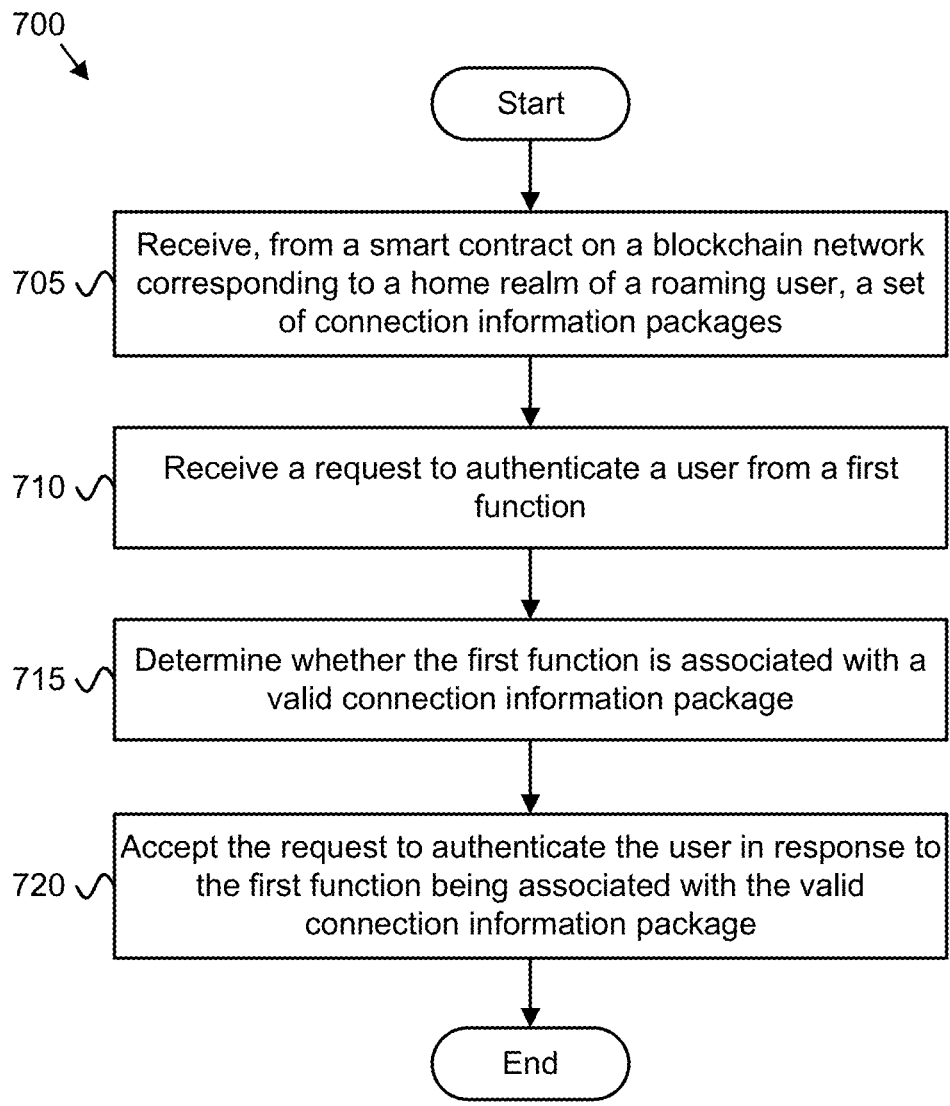
FIG. 7 is a schematic flow chart diagram illustrating another embodiment of a method for user authentication using a connection information package provided by a blockchain network.

FIG. 7 depicts a method 700 for user authentication using a connection information package provided by a blockchain network, according to embodiments of the disclosure. In some embodiments, the method 700 is performed by an apparatus, such as the AAA function 132, the HAF 220, and/or the authentication apparatus 400. In certain embodiments, the method 700 may be performed by a processor executing program code, for example, a microcontroller, a microprocessor, a CPU, a GPU, an auxiliary processing unit, a FPGA, or the like.

The method 700 begins with receiving 705, from a smart contract on a blockchain network corresponding to a home realm of a roaming user (e.g., from a first blockchain address), a set of connection information packages. Here, each connection information package comprises a respective validity parameter and respective information enabling a connection with an authentication server in the home realm. In various embodiments, each connection information package is created, e.g., by the blockchain network, in response to a message being sent to the first address in the blockchain network.

More specifically, the message triggers a transaction with a smart contract in the blockchain network, the transaction being recorded in the shared ledger of the blockchain network, and the smart contract sends a connection information package to the authentication function. Here, the first blockchain address points to a smart contract associated with a realm of the authentication function. The message may include the payment and a first address of the sender, such as an IP address or a hostname. In certain embodiments, receiving 705 the set of connection information packages includes receiving a connection information package in response to the payment being inserted into a shared ledger of the blockchain network. Note that the blockchain network contains a single ledger shared among the nodes of the blockchain network.

In some embodiments, each connection information package comprises a first network address of a corresponding function permitted to use the connection information package and a realm of the authentication function. The first network address may be an IP address and a hostname of the corresponding function. In certain embodiments, each connection information package further comprises a public encryption key of the corresponding function.

In some embodiments, the validity parameter comprise an expiration time and date of the corresponding connection information package. Here, the corresponding connection information package becomes invalid after the expiration time and date. In some embodiments, the validity parameter comprises an indicator of a permitted number of authentication requests using the corresponding connection information package. Here, the corresponding connection information package becomes invalid after being used the permitted number of times.

The method 700 includes receiving 710, at the authentication function and from a first function, a request to authenticate a user. In certain embodiments, receiving 710 the request to authenticate a user includes receiving a user authentication request from a second IP address belonging the first function. In various embodiments, the first function includes an authentication, authorization, and accounting ("AAA") function in a mobile communication network visited by the user. Moreover, the authentication function may include an AAA server in a home network of the user.

In some embodiments, the request to authenticate a user comprises a package identifier and a message authentication code. Here, the package identifier indicates a particular one of the set of connection information packages and the message authentication code is computed based on the private key of the first function. The package identifier and message authentication code may be used to verify that the sender of the request to authenticate a user is authorized to use the indicated connection information package.

The method 700 includes determining 715 whether the first function is associated with a valid one of the set of connection information packages. Here, each connection information package may be associated with a specific entity permitted to use the connection information package. In one embodiment, the sender of the message that triggered the creation of the connection information package is the permitted entity.

In some embodiments, determining 715 whether the first function is associated with a particular connection information package includes checking whether the request to authenticate a user was received from an IP address or hostname included in the connection information package (e.g., whether the second network address matches the first network address). Here, a hostname in the connection information package may be resolved into a first IP address which is then compared to the IP address of the first function (e.g., the second network address). Moreover, determining 715 whether the first function is associated with a connection information package may also include verifying the message authentication code using the public key of the particular connection information package identified by the package identifier.

The method 700 includes accepting 720, at the authentication function, the request to authenticate a user in response to the first function being associated with one of the plurality of connection information package. In some embodiments, accepting 720 the authentication request includes authenticating the user via the first function. Moreover, accepting 720 the request in response to the first function being associated with a connection information package may also include rejecting the request to authenticate a user in response to determining that no connection information package is associated with to the first function.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. An apparatus comprising:
   a processor; and
   a memory coupled to the processor, the memory comprising instructions executable by the processor to cause the apparatus to:
   receive, from a smart contract on a blockchain network corresponding to a home realm of a roaming user, a set of connection information packages, each connection information package comprising a respective validity parameter and respective information enabling a connection with an authentication server in the home realm;
   receive, from a first function, a request to authenticate the roaming user;
   determine whether the first function is associated with a valid connection information package; and
   accept the request to authenticate the roaming user in response to the first function being associated with the valid connection information package.

2. The apparatus of claim 1, wherein each respective connection information package further comprises a first network address of a corresponding function permitted to use the respective connection information package, the first network address being one of an IP address and a hostname of the corresponding function.

3. The apparatus of claim 2, wherein the request to authenticate the roaming user is received from a second network address associated with the first function, wherein to determine whether the first function is associated with the valid connection information package, the instructions are further executable by the processor to cause the apparatus to determine whether the second network address matches the first network address in the valid connection information package.

4. The apparatus of claim 1, wherein the blockchain network contains a shared single ledger for all nodes of the blockchain network, wherein the smart contract corresponds to a first address on the blockchain network, the smart contract comprising executable code stored in the shared single ledger of the blockchain network.

5. The apparatus of claim 1, wherein a respective connection information package is created in response to a message sent to the smart contract comprising a payment and a first network address of a sender of the message.

6. The apparatus of claim 1, wherein the instructions are further executable by the processor to cause the apparatus to reject the request to authenticate the roaming user in response to determining that no connection information package is associated with the first function.

7. The apparatus of claim 1, wherein the respective validity parameter comprises an expiration time and date of a corresponding connection information package, wherein the corresponding connection information package becomes invalid after the expiration time and date.

8. The apparatus of claim 1, wherein the respective validity parameter comprises an indicator of a permitted number of authentication requests using a corresponding connection information package, wherein the corresponding connection information package becomes invalid after being used the permitted number, and wherein to accept the request to authenticate the roaming user, the instructions are further executable by the processor to cause the apparatus to update the permitted number of authentication requests.

9. The apparatus of claim 1, wherein the request to authenticate the roaming user comprises a package identifier and a message authentication code, wherein the package identifier indicates a particular one of the set of connection information packages, and wherein the message authentication code is computed based on a private key of the first function.

10. The apparatus of claim 9, wherein each respective connection information package includes a public key of a corresponding first function permitted to use the respective connection information package, wherein to determine whether the first function is associated with a valid connection information package, the instructions are further executable by the processor to cause the apparatus to verify the message authentication code using the public key of a corresponding connection information package identified by the package identifier.

11. A method comprising:
    receiving, from a smart contract on a blockchain network corresponding to a home realm of a roaming user, a set of connection information packages, each connection information package comprising a respective validity parameter and respective information enabling a connection with an authentication server in the home realm;
    receiving, from a first function, a request to authenticate the roaming user;
    determining whether the first function is associated with a valid connection information package; and
    accepting, at an authentication function in the home realm, the request to authenticate the roaming user in response to the first function being associated with the valid connection information package.

12. The method of claim 11, wherein each respective connection information package further comprises a first network address of a corresponding function permitted to use the respective connection information package, the first network address being one of an IP address and a hostname of the corresponding function.

13. The method of claim 12, wherein the request to authenticate the roaming user is received from a second network address associated with the first function, wherein determining whether the first function is associated with the valid connection information package comprises determining whether the second network address matches the first network address in the valid connection information package.

14. The method of claim 11, wherein the blockchain network contains a shared single ledger for all nodes of the blockchain network, wherein the smart contract corresponds to a first address on the blockchain network, the smart contract comprising executable code stored in the shared single ledger of the blockchain network.

15. The method of claim 11, wherein a respective connection information package is created in response to a message sent to the smart contract comprising a payment and a first network address of a sender of the message.

16. The method of claim 11, further comprising rejecting the request to authenticate the roaming user in response to determining that no connection information package is associated with the first function.

17. The method of claim 11, wherein the respective validity parameter comprises an expiration time and date of a corresponding connection information package, wherein the corresponding connection information package becomes invalid after the expiration time and date.

18. The method of claim 11, wherein the respective validity parameter comprises an indicator of a permitted number of authentication requests using a corresponding connection information package, wherein the corresponding connection information package becomes invalid after being used the permitted number, wherein accepting the request to authenticate the roaming user includes updating the permitted number of authentication requests.

19. The method of claim 11, wherein the request to authenticate the roaming user comprises a package identifier and a message authentication code, wherein the package identifier indicates a particular one of the set of connection information packages, and wherein the message authentication code is computed based on a private key of first function.

20. The method of claim 19, wherein each respective connection information package includes a public key of a corresponding first function permitted to use the respective connection information package, wherein determining whether the first function is associated with a valid connection information package comprises verifying the message authentication code using the public key of a corresponding connection information package identified by the package identifier.

* * * * *